United States Patent [19]
Jakobsen

[11] 3,907,960
[45] Sept. 23, 1975

[54] METHOD FOR PRODUCING A SUBSTANTIALLY VOIDLESS FILAMENT REINFORCED RESIN MATRIX COMPOSITE

[75] Inventor: Karl Severin Jakobsen, Somers, Conn.

[73] Assignee: United Technologies Corporation, Hartford, Conn.

[22] Filed: Nov. 1, 1972

[21] Appl. No.: 302,976

[52] U.S. Cl. .............................. 264/273; 264/258
[51] Int. Cl. ........................ B29d 3/02; B31c 13/00
[58] Field of Search ........... 264/257, 258, 259, 250, 264/263, 271, 331, 219, 262, 273; 260/32.8 N, 78 TF

[56] References Cited
UNITED STATES PATENTS

| | | | |
|---|---|---|---|
| 1,864,331 | 6/1932 | Whitesmith | 264/258 |
| 2,760,899 | 8/1956 | Cameron et al. | 264/257 |
| 3,095,138 | 6/1963 | Warnken | 416/190 |
| 3,179,631 | 4/1965 | Endrey | 260/32.8 N |
| 3,184,527 | 5/1965 | Fischer | 264/257 |
| 3,218,383 | 11/1965 | White | 264/255 |
| 3,554,668 | 1/1971 | Wagle | 415/214 |
| 3,700,617 | 10/1972 | Golownia | 260/78 TF |

*Primary Examiner*—Robert F. White
*Assistant Examiner*—Willard E. Hoag
*Attorney, Agent, or Firm*—John D. Del Ponti

[57] ABSTRACT

A method of producing a substantially voidless filament reinforced resin matrix composite comprising placing a filament reinforced uncured resin matrix composite in a mold cavity to occupy a portion of the cavity, the resin matrix being at least partially desolvated and containing voids, filling the remaining portion of the cavity with dry uncured resin powder of the same resin as the matrix resin and compression molding whereby the resin powder melts and acts to transfer pressure isostatically to the composite and to infiltrate the resin matrix and fill the voids.

2 Claims, 1 Drawing Figure

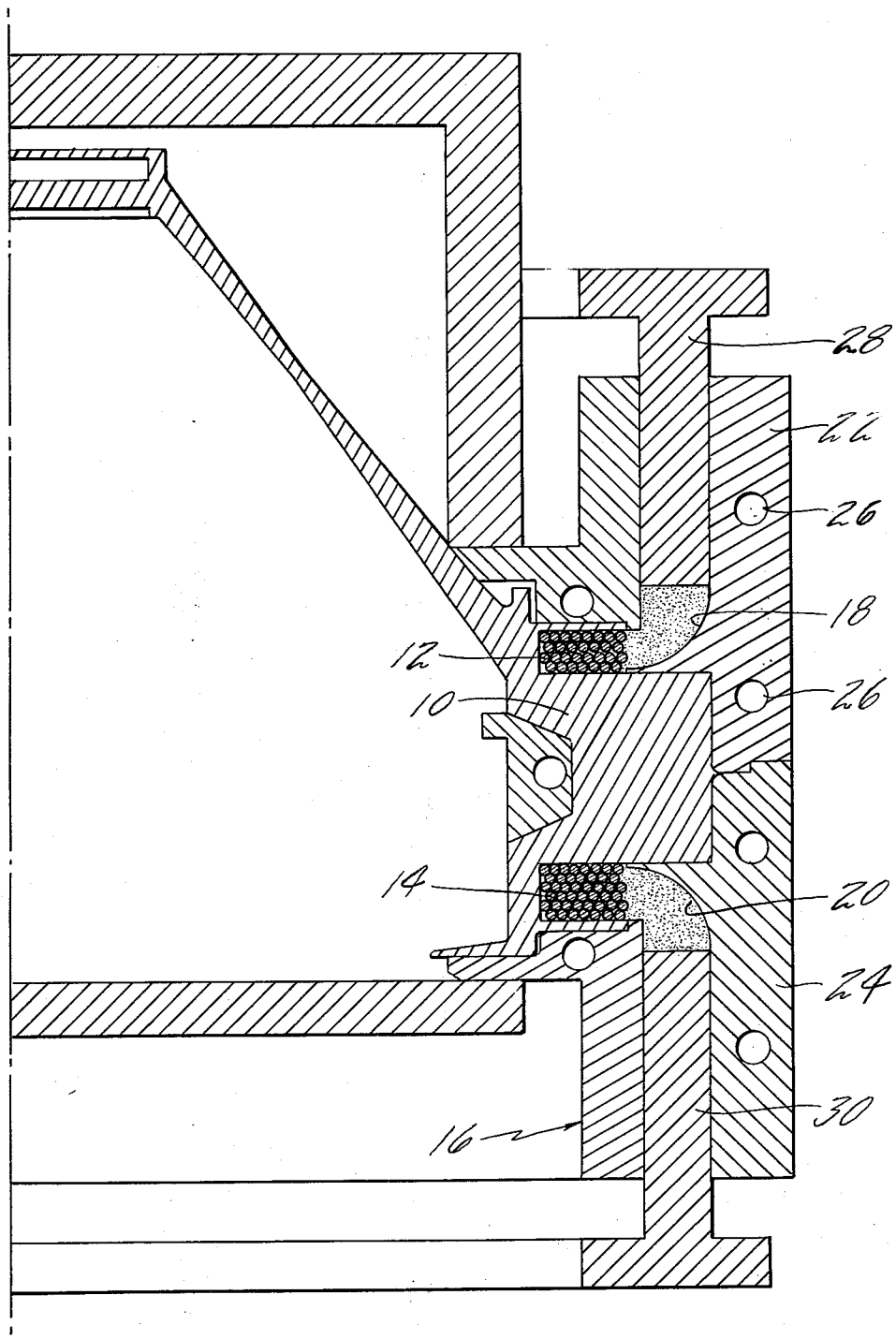

3,907,960

METHOD FOR PRODUCING A SUBSTANTIALLY VOIDLESS FILAMENT REINFORCED RESIN MATRIX COMPOSITE

BACKGROUND OF THE INVENTION

The invention herein described was made in the course of or under a contract, or under subcontract thereunder, with the Department of the Air Force.

The present invention relates to a compression molding method and more particularly to a method for compression molding a filament reinforced resin matrix composite such as that for a hoop-wound disk for a gas turbine engine.

It is known to use circumferentially wound high modulus, high strength filaments to reinforce a rotor assembly as evidenced by copending U.S. Pat. Application Ser. No. 249,283 filed by Stargardter et al. on May 1, 1972 and assigned to the same assignee as the present invention. The primary advantage of utilizing such filaments as those composed of boron, carbon, silicon carbide or silicon carbide coated boron or the like is their high strength and light weight. When these filaments are provided as a circumferential winding embedded in a matrix material such as resin or metal about a rotatable body, their high tensile strength translates into high hoop strength for carrying large centrifugal loads.

At present, one of the primary problems resides in the processing technique utilized to provide uniform cross-sectional distribution of the reinforcing filaments in a cured void-free resin matrix. In particular, problems have persisted where the resin matrix is provided as a resin-solvent solution since the removal of the solvent, as by evaporation during cure, results in the occurrence of voids throughout the matrix.

SUMMARY OF THE INVENTION

The present invention relates to a process for compression molding a filament reinforced resin matrix composite in a manner to achieve uniform compaction and a void-free matrix. More particularly, the invention contemplates the steps of placing an uncured solvated resin matrix composite in a mold cavity to occupy a portion of the cavity, the resin matrix being at least partially desolvated and containing voids, filling the remaining portion of the cavity with dry uncured resin powder of the same resin as the matrix resin and applying heat and pressure to the mold cavity sufficient to melt the resin, the melted resin powder acting to transfer pressure isostatically to the composite and to infiltrate the resin matrix to fill the voids therein.

In a preferred embodiment of the invention, the composite is in the form of composite hoops circumferentially wet-wound around a circumference of a gas turbine engine disk. A polyimide resin matrix of the composite is partially desolvated by heating in air and the disk portion containing the composite hoops is then placed in a mold or die cavity to occupy a portion thereof. The remaining portion of the cavity is filled with polyimide resin powder and is subjected to sufficient heat and pressure to melt the resin powder to cause isostatic pressure transfer and resin infiltration of the voids.

BRIEF DESCRIPTION OF THE DRAWING

An understanding of the invention will become more apparent to those skilled in the art by reference to the following detailed description when viewed in light of the accompanying drawing which shows, in section, a composite reinforced gas turbine engine disk portion emplaced within a mold prior to compression molding.

DESCRIPTION OF THE PREFERRED EMBODIMENT

Referring now to the drawing, a titanium compressor disk 10 is provided with a pair of circumferential slots in which a composite 12 and 14, respectively is provided. The composite for gas turbine engine application is preferably comprised of high modulus, high strength, low density filaments such as boron, carbon, silicon carbide, silicon carbide coated boron or the like embedded in a matrix material such as a metal, e.g. aluminum, magnesium or the like or, more preferably, a high temperature resin such as polyimide, polybenzimidiazole, polybenzothiozole, polyoxadiazole or the like. Typically, the filaments are continuous and unidirectionally oriented in a circumferential manner about the axis of rotation of the disk as a result of a wet-winding process. The filaments are, for example, unreeled from a supply spool, and are passed through a resin bath comprising the resin in solvent solution before being hoop wound about the disk, or, more preferably, are sprayed or squirted with the solvated resin as by an air pressurized gun during winding. The resin matrix is then at least partially desolvated by exposure to heating means such as a forced air oven.

The composites are thereafter ready for compression molding and are placed in the cavity of circular die 16 which is coaxial with the disk 10. It will be appreciated that the disk 10 actually becomes part of the die 16 and forms double circular cavities 18 and 20, one for each composite, as shown in the drawing. The die 16 is actually of split die configuration with circular die blocks 22 and 24 secured in place by a retaining and lifting ring (not shown). Internal heating means such as resistance heating coils 26 are located in the walls of the die and top and bottom punches 28 and 30, respectively, are provided to produce a radial force during the molding procedure. The punches are also circular to provide a continuous and uniform pressure to their respective cavities. With the composite and associated disk in place in the mold, the remaining portion of the cavities 18 and 20 are filled with dry resin powder of the same resin as the desolvated resin matrix. The mold is then heated to a temperature sufficiently high to melt the resin while pressure is applied by punches 26 and 28. The melted resin powder acts as a pressure transfer medium to transfer the pressure isostatically along the exposed surface of the composite and also to infiltrate and fill the voids therein.

In one investigation, four mil boron filament commercially available from Hamilton Standard Division of United Aircraft Corporation was wetted, by spraying, with P13N polyimide resin paste comprising approximately 36 precent, by weight, dimethylformimide solvent and wound about a titanium compressor disk as set forth in copending application Ser. No. 302,977 entitled, Process for Wet Winding Filaments, filed on the same date as the present application and assigned to the same assignee. The disk was then oven dried in a forced air oven for 8 hours at 180°F and assembled in the compression mold shown in the drawing. A dried, uncured P13N polyimide resin powder mixture used as the pressure transfer medium from the mold punch to the composite was loaded at the periphery of the disk and had the following make-up: 18.2 wt. percent — 0.0098 inch = .0049 inch screen size opening, 72.2 wt. percent — 0.0049 inch = 0.0025 inch screen size opening and 9.2 wt. percent — 0.0025 inch screen size opening. The compression mold, to properly cure the P13N resin, was heated from room temperature to 600°F at a heat-up rate of 8.3°F per minute and held at 600°F for one hour, an initial pressure of 50 psi being applied until 425°F and then a pressure of 500 psi thereafter. To maximize uniformity of curing, step curing was utilized. In this procedure, the disk is wound in stages, as for example to thicknesses of 0.112 inch for each stage, with the composite subjected to desolvating by forced air oven drying and then to the above cure parameters after each stage. Disks fabricated according to the above procedure were substantially voidless, the voids occasioned by the desolvating procedure being infiltrated and filled by virtue of the presence of the resin pressure transfer medium. In one series of investigations, a disk fabricated in a five step cure procedure was successfully proof tested at the following conditions:

77°F — 10,500 rpm for 5 minutes and 11,000 rpm for 1 minute;
350°F — 10,000 rpm for 5 minutes and 11,000 rpm for 1 minute; and
600°F — 8,600 rpm for 2 hours.

Another disk, also made according to step cure procedure was subjected to a stress survey as follows:

Ambient and 350°F stress survey in 1,000 rpm increments to 10,500 rpm. Speed then raised to 11,000 rpm; and
600°F stress survey in 1,000 rpm increments to 8,600 rpm.

Results of the survey indicated that the stress determined experimentally were within 10 percent of those predicted analytically. Following this survey, the disk was subjected to low cycle fatigue (LCF) testing at cycles from idle (5,000 rpm) to sea level take-off (10,200 rpm). Testing was conducted at 350°F/40 cycles per hour to 4,000 cycles. Testing was interrupted at 2,000 and 3,000 cycles for dimensional inspection and/or visual inspection. Post-test inspections including visual, dimensional, X-ray and zyglo showed no deterioration.

What has been set forth above is intended primarily as exemplary to enable those skilled in the art in the practice of the invention and it should therefore be understood that, within the scope of the appended claims, the invention may be practiced in other ways than as specifically described.

What is claimed is:

1. In a process for producing a gas turbine engine disk having at least one composite of high modulus, high strength filaments hoop wound about a circumference thereof and embedded in a high temperature resin matrix, a method for making said composite substantially voidless comprising:

applying filament reinforced uncured resin matrix composite windings about a circumferential surface of said disk, said resin matrix being at least partially desolvated and containing voids;
positioning said disk coaxially within a female mold member so that an outer circumferential surface of said disk forms an annular mold cavity with an inner surface of said female mold member;
filling a remaining portion of said mold with dry uncured resin powder, said powder being of the same resin as the matrix;
applying heat to said mold sufficient to melt said resin and
moving a ring-like plunger axially in an annular cavity communicating with said annular mold cavity, to apply pressure uniformly and radially to the periphery of said matrix and to cause said resin to infiltrate said matrix and to fill said voids.

2. The invention of claim 1 wherein said reinforcing filament is selected from the group consisting of boron, carbon, silicon carbide and silicon carbide coated boron and said resin is selected from the group consisting of polyimide, polybenzimadazole, polybenzothiozole and polyoxadiazole.

* * * * *

UNITED STATES PATENT OFFICE
CERTIFICATE OF CORRECTION

PATENT NO. : 3,907,960
DATED : September 23, 1975
INVENTOR(S) : KARL S. JAKOBSEN It is certified that error appears in the above—identified patent and that said Letters Patent are hereby corrected as shown below:

Column 3, line 2: "=.0049" should read --+ .0049--

Column 3, line 3: "=0.0025" should read --+0.0025--

Signed and Sealed this ninth Day of December 1975

[SEAL]

Attest:

RUTH C. MASON
Attesting Officer

C. MARSHALL DANN
Commissioner of Patents and Trademarks